G. CUPPERS.

Illuminating Apparatus.

No. 5,098.

Reissued Oct. 15, 1872.

Witnesses { John K. Rupertus
Thomas McIlvain

Saml. Raymor
Austin E. Fox
R. G. Berford
By their attys.
Howson and Son

AM. PHOTO-LITHOGRAPHIC CO. N.Y. (OSBORNE'S PROCESS.)

UNITED STATES PATENT OFFICE.

GUSTAVUS CUPPERS, OF BROOKLYN, N. Y., ASSIGNOR, BY MESNE ASSIGNMENTS, TO SAMUEL RAYNOR, AUSTIN E. FOX, AND R. G. BERFORD.

IMPROVEMENT IN ILLUMINATING APPARATUS.

Specification forming part of Letters Patent No. 121,234, dated November 28, 1871; reissue No. 5,098, dated October 15, 1872.

*To all whom it may concern:*

Figure 1:
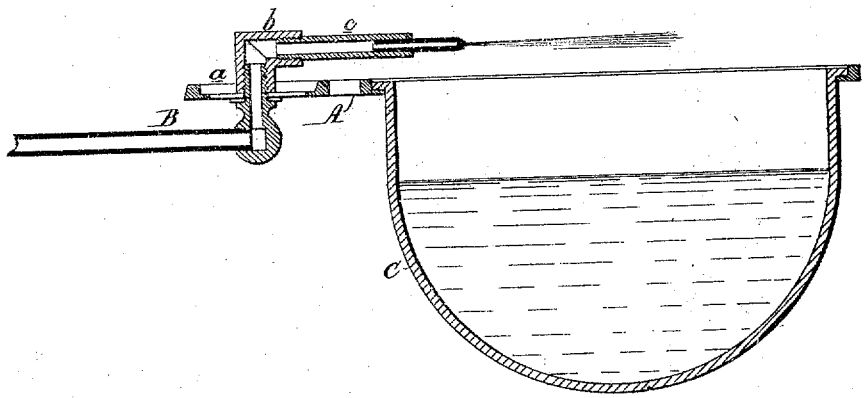
Figure 2:
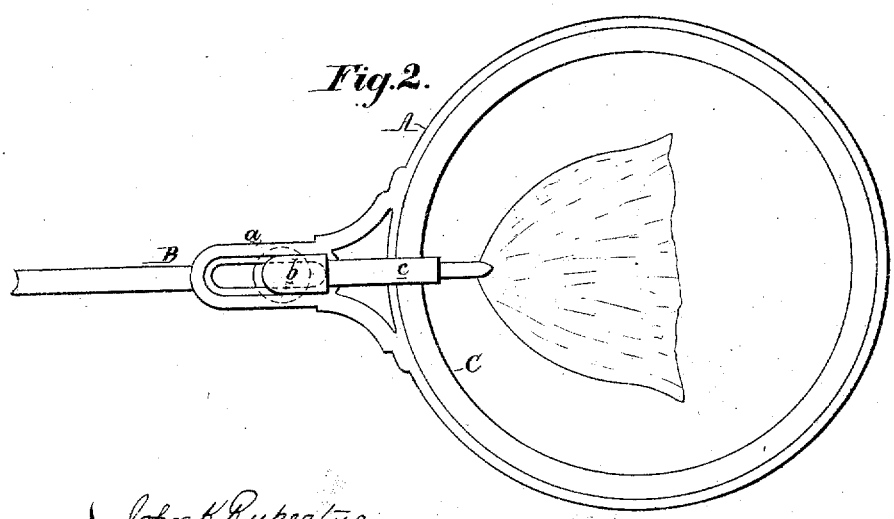

Be it known that GUSTAVUS CUPPERS, of Brooklyn, E. D., New York, has invented an Improvement in Illuminating Apparatus, of which the following is a specification:

The invention of the said GUSTAVUS CUPPERS has for its object the obtaining of increased illumination from a flame, and this object is attained by the combination illustrated in the accompanying drawing—that is to say, by a glass cup, C, so combined with a gas-burner, *c*, that the flame therefrom will extend over the cup, through which, and through water or other suitable fluid contained therein, the light will be transmitted. In the present instance, the cup is of the hemispherical form, shown in vertical section, Fig. 1, and is suspended below the burner *c* by means of a ring bracket, A, a flange on the upper edge of the cup resting on the ring, and this ring having a slotted arm, *a*, confined to a nipple on a gas-pipe, B, by means of an elbow, *b*, which is screwed onto the nipple and which receives the burner *c*. Owing to the slot in the arm *a*, as shown in the plan view, Fig. 2, the cup can be readily adjusted so that its center shall be directly below the flame. When the cup is filled with water or other suitable liquid the illuminating effect below the cup is increased four-fold or thereabout.

If desired, a dome-shade or globe may be placed over the burner.

We claim as the invention of the said GUSTAVUS CUPPERS—

1. The combination of a cup and a burner, so arranged that the light from the flame may pass downward through the cup without being obstructed by the burner or any part thereof.

2. The ring-bracket A supporting the suspended cup *c*, in combination with the gas-burner above the cup.

3. The slotted arm *a* on the ring-bracket, in combination with the cup *c* and burner *e*.

In testimony whereof we have signed our names to this specification in the presence of two subscribing witnesses.

SAMUEL RAYNOR.
AUSTIN E. FOX.
R. G. BERFORD.

Witnesses as to SAMUEL RAYNOR:
DAVID A. BOWER,
SAMUEL P. BELL.

Witnesses as to A. E. FOX and R. E. BERFORD:
FRANK H. CHAPIN,
FRED. A. JONES.